(12) United States Patent
Bostick et al.

(10) Patent No.: US 7,519,663 B1
(45) Date of Patent: Apr. 14, 2009

(54) SYSTEM FOR RECALLING DECLINED MEETINGS

(75) Inventors: James Edward Bostick, Cedar Park, TX (US); John Michael Ganci, Jr., Cary, NC (US); John Paul Kaemmerer, Pflugerville, TX (US); David Scott Wenk, Byron Center, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/099,151

(22) Filed: Apr. 8, 2008

(51) Int. Cl.
*G06F 15/16* (2006.01)
*G06F 9/46* (2006.01)
*G06F 15/02* (2006.01)
*G06F 3/00* (2006.01)
*G05B 19/418* (2006.01)
*G04G 11/00* (2006.01)

(52) U.S. Cl. .................. 709/204; 709/205; 709/206; 705/9; 708/112; 715/753; 715/963

(58) Field of Classification Search ......... 709/203–207, 709/219; 705/8, 9; 708/112; 715/739, 753, 715/963
See application file for complete search history.

(56) References Cited

U.S. PATENT DOCUMENTS

| | | | | |
|---|---|---|---|---|
| 6,016,478 A * | 1/2000 | Zhang et al. | ............ | 705/9 |
| 6,167,379 A * | 12/2000 | Dean et al. | ............ | 705/9 |
| 6,828,989 B2 * | 12/2004 | Cortright | ............ | 715/769 |
| 7,149,810 B1 * | 12/2006 | Miller et al. | ............ | 709/246 |
| 7,200,639 B1 * | 4/2007 | Yoshida | ............ | 709/208 |
| 7,225,442 B2 * | 5/2007 | Dutta et al. | ............ | 718/100 |
| 7,334,000 B2 * | 2/2008 | Chhatrapati et al. | ...... | 707/104.1 |
| 7,349,920 B1 * | 3/2008 | Feinberg et al. | ............ | 707/102 |
| 7,359,946 B2 * | 4/2008 | Thakkar et al. | ............ | 709/206 |
| 7,415,500 B2 * | 8/2008 | Morris et al. | ............ | 709/204 |
| 2001/0049617 A1 * | 12/2001 | Berenson et al. | ............ | 705/8 |
| 2003/0154116 A1 * | 8/2003 | Lofton | ............ | 705/8 |

(Continued)

OTHER PUBLICATIONS

Selected Screenshots of Microsoft Office Outlook 2003 showing that declined events may be accessed from the "Deleted Items" folder and subsequently reactivated.*

(Continued)

*Primary Examiner*—Larry D Donaghue
*Assistant Examiner*—Melvin H Pollack
(74) *Attorney, Agent, or Firm*—Christina M. Eakman

(57) ABSTRACT

A calendar system enables a user to display both accepted and declined invitations to events in a same or any time slot. Declined invitations can be later recalled and have their status changed to accepted. To recall a previously declined invitation for acceptance, the declined event displayed on the calendar is opened, the status changed from declined to accepted, and the updated accepted status is sent to the sender to indicate that a previously declined event has now been accepted. Declined events are differentiated from accepted events on the calendar display by displaying the declined events on the calendar in a different color, automatically inserting and displaying a keyword such as "DECLINED" in the subject line, displaying a subject line of declined events indented from a subject line of accepted events in the same or different time slot, displaying a different icon in front of the calendar event time slot when the event has been declined, and/or configuring the declined events with various font formats.

1 Claim, 4 Drawing Sheets

U.S. PATENT DOCUMENTS

| | | | | |
|---|---|---|---|---|
| 2004/0122721 | A1* | 6/2004 | Lasorsa | 705/8 |
| 2005/0216842 | A1* | 9/2005 | Keohane et al. | 715/733 |
| 2006/0287905 | A1* | 12/2006 | Stoner | 705/9 |
| 2007/0016646 | A1* | 1/2007 | Tendjoukian et al. | 709/206 |
| 2007/0198316 | A1 | 8/2007 | Boland et al. | |
| 2007/0239509 | A1 | 10/2007 | Kaminsky et al. | |
| 2008/0015922 | A1* | 1/2008 | Nelken | 705/8 |
| 2008/0082606 | A1* | 4/2008 | Gupta et al. | 709/204 |
| 2008/0140488 | A1* | 6/2008 | Oral et al. | 705/8 |
| 2008/0141142 | A1* | 6/2008 | Lyle et al. | 715/751 |
| 2008/0141145 | A1* | 6/2008 | Klausmeier | 715/751 |
| 2008/0148148 | A1* | 6/2008 | Ramanathan et al. | 715/700 |
| 2008/0152114 | A1* | 6/2008 | Kim et al. | 379/205.01 |
| 2008/0162247 | A1* | 7/2008 | Hurmola et al. | 705/9 |
| 2008/0162614 | A1* | 7/2008 | Hurmola et al. | 708/112 |
| 2008/0168113 | A1* | 7/2008 | Hickling et al. | 708/112 |
| 2008/0191896 | A1* | 8/2008 | Jain et al. | 340/825.22 |
| 2008/0195448 | A1* | 8/2008 | May | 705/8 |
| 2008/0243582 | A1* | 10/2008 | Chen et al. | 705/9 |

OTHER PUBLICATIONS

Mann, Bill. "How to Do Everything with Microsoft Office Outlook 2003," McGraw-Hill/Osborne, 2003, pp. 172-187, 192-195, 205-208, 404-408.*
Sun ONE Calendar Server Calendar Express Online Help, University of Colorado, Jul. 23, 2002, pp. 1-31.*
University of Colorado, "Calendar Quick Reference Sheet," 2002, pp. 1-2.*
Conner, Nancy, "Google Apps: The Missing Manual, 1st Edition," Chapter 7.3, Jun. 3, 2008, pp. 1-20.*
Zimbra/Meeting Maker Comparison, College of New Jersey, 2003, pp. 1-4.*
Jurach, Tom. "Outlook Calendaring Event Interface," IET Exchange Workshop, Aug. 7, 2006, pp. 1-9.*

* cited by examiner

Icon to use: 
Font: Italics, strikethrough
Color: Red
Indent subject: Yes
Type Subject identifier if desired or leave blank: DECLINED

SYSTEM FOR RECALLING DECLINED MEETINGS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to an electronic calendar application, and more specifically, to an electronic calendar application that enables the user to display both accepted and declined invitations to events in order that declined invitations can be later recalled and have their status changed to accepted, if desired.

2. Description of the Related Art

Often, two meetings are scheduled for the same time. Employees usually prioritize and pick the one meeting that is most important and accept that invitation. The employees normally decline the second meeting or tentatively accept the second meeting, mostly to let the meeting chair know that they will not be present or that they might actually be coming, respectively. These meetings may be scheduled so far in advance that the employee will forget completely about the second meeting. In the case when the first meeting is canceled, there is no reminder about the second meeting or way to clearly differentiate the status between all of the meetings. This meeting may be of interest and value to the employee, but the end user has forgotten about it and ends up not attending.

BRIEF SUMMARY OF THE INVENTION

According to one embodiment of the present invention, the electronic calendar application functions allow the user to receive a plurality of invitations to one or more events from at least one sender, mark the received invitations as accepted or declined, respond to the at least one chair (sender) with a status message that the user is expected/not expected to attend the chair's received invitation, display the invitations and their respective status on the calendar in corresponding event time slots, and then later recall and accept the declined event even if the time slot still had another event at the same time. Declined event invites may be placed on the calendar regardless if there is an event already at the time slot, or if there is no conflict there but the user wants to still decline the event.

All declined events stay in Notes or calendar memory (e.g., hard drive) and show up on the user's calendar as declined events. The declined events are differentiated from accepted events on the calendar, such as by showing the declined events in a different color, having a word like "DECLINED" inserted in the subject line automatically, having an indented subject line that shows differently than normally accepted event notices, adding a different icon in front of the calendar entry, and/or configuring the entry with various font formats, such as using strike-through, bold, italics, etc. The calendar application provides these and other configurable options to the user so that the user can differentiate the look of these declined event notices. By having declined entries displayed on the calendar, the end user can easily go back at any time and manually accept those entries. At any time, the user can also delete the declined event notice from the calendar entry without it notifying the chair, since the calendar system notified the chair of that decision when the event was first declined.

BRIEF DESCRIPTION OF THE DRAWINGS

FIG. 1 is a screen view of three meeting invites received for the same day.

FIG. 2 is a screen view when the user opens the FIG. 1 bottom meeting invite received at 11:21 AM.

DETAILED DESCRIPTION OF THE INVENTION

Figure 3:
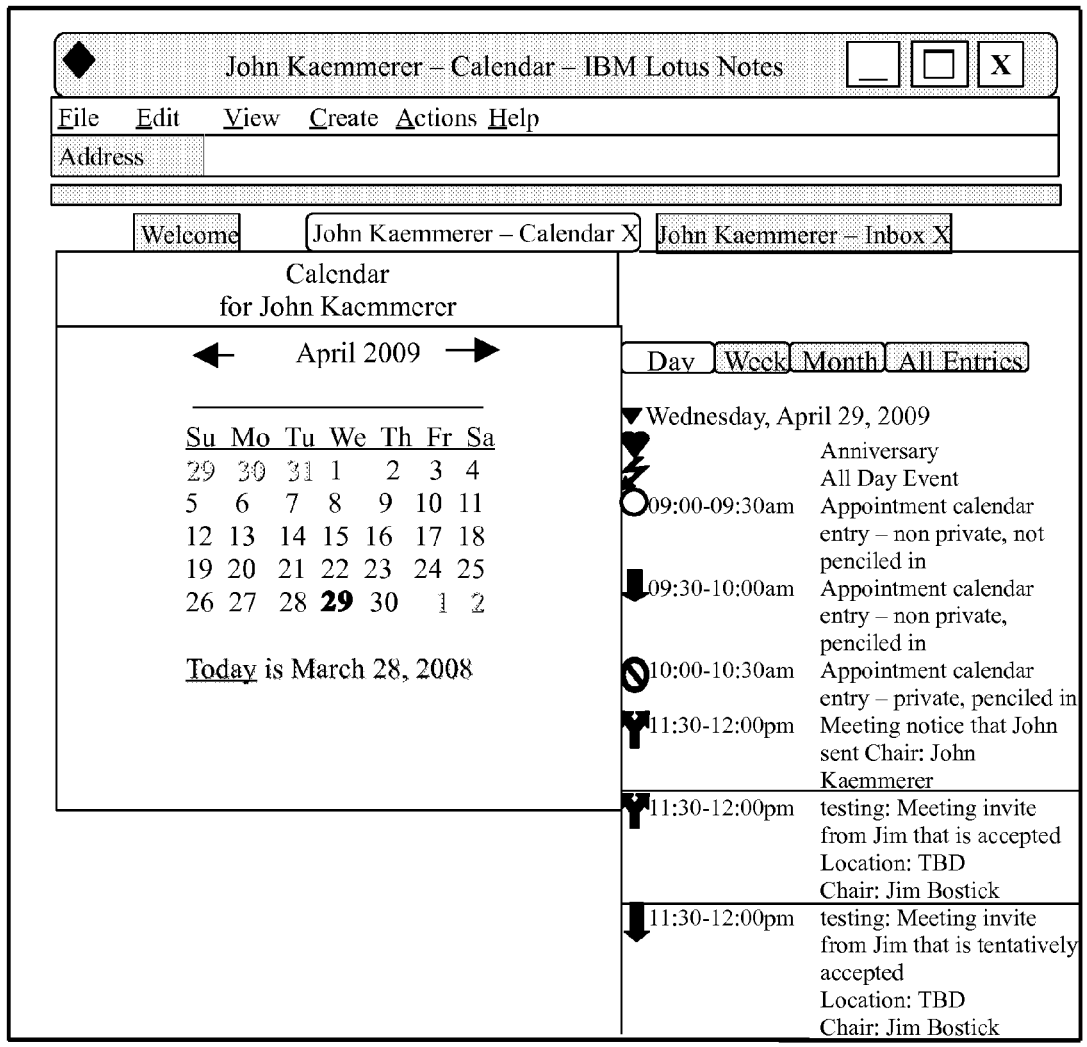
FIG. 3 is a screen view for the Apr. 29, 2009 calendar day and information recorded for that day.

As will be appreciated by one of ordinary skill in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to a flowchart illustration and/or block diagrams of methods, apparatus (systems) (not shown) and computer program products according to embodiments of the invention. It will be understood that each block of the flowchart illustration and/or block diagrams, and combinations of blocks in the flowchart illustration and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figures 1, 2:
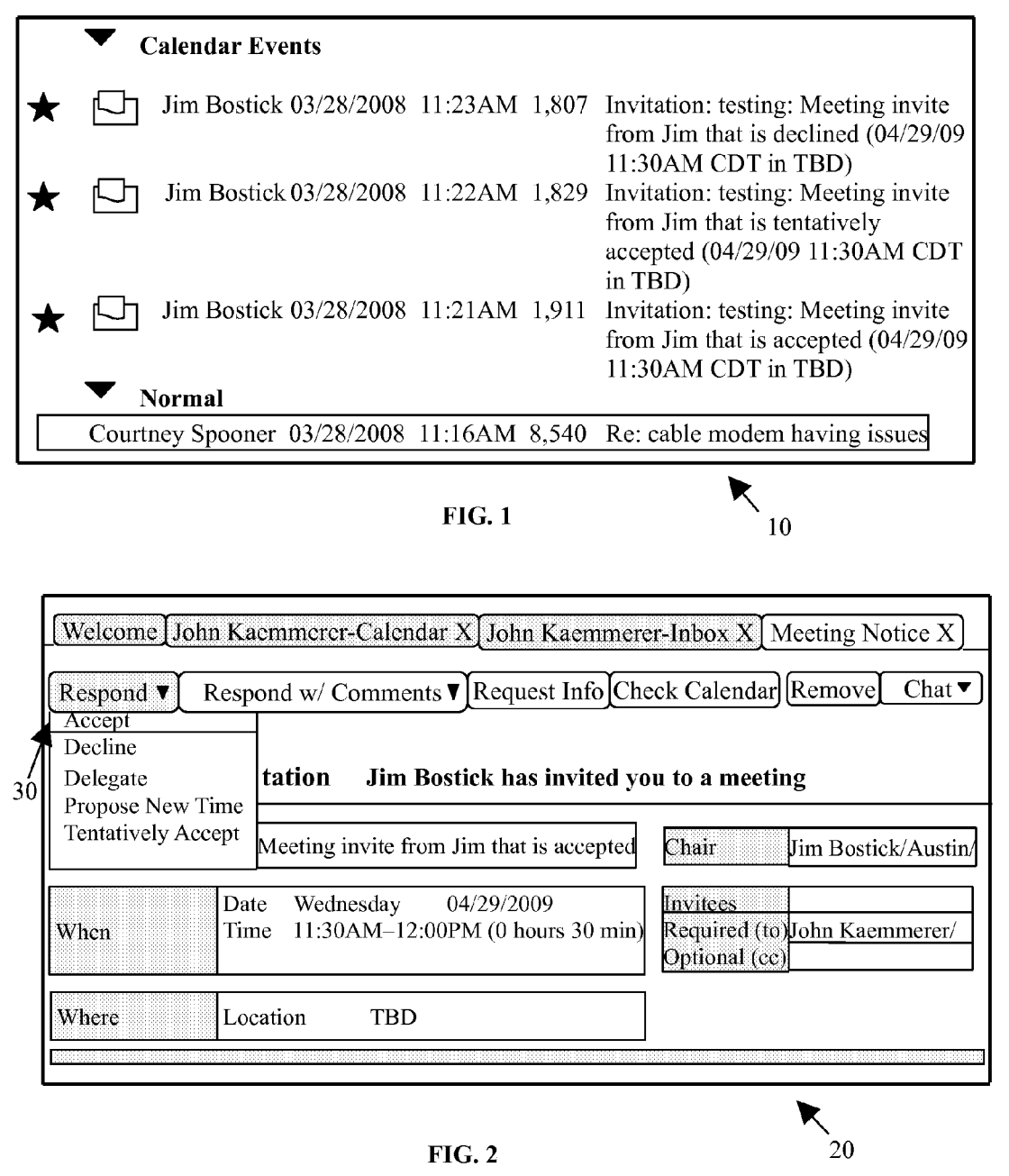

An electronic calendar application for use in a computer or network system displays the meetings/events schedule of the end user. With reference to FIG. 1, when the end user receives invitations from senders, also known as chairs, a screen 10 shows the received invitations to the user. The user may then decide whether to accept or decline the invitations. In FIG. 1, screen 10 shows three meeting invites sent by Jim to the end user. All three meetings are for the same day and time slot, Apr. 29, 2009 at 11:30 AM.

FIG. 2 references a screen view 20 when the end user opens the FIG. 1 bottom meeting invite received at 11:21 AM. Using a Respond pulldown 30, the user marks the event notice for the meeting as accepted. The calendar application sends the accepted status back to the chair (sender), and displays the accepted invitation on the end user's calendar as an accepted event in the appropriate time slot. Besides accepting or declining, the calendar application may include other responses in Respond pulldown 30, such as delegate, propose new time, or tentatively accept. The calendar application then fills in further received invitations for events in appropriate calendar time slots. When the user decides to decline a received invitation, the user selects the declined option using the Respond pulldown 30. In response, the calendar application marks the invitation as declined, sends the declined status back to the chair (sender), and displays the declined invitation on the calendar as a declined event in the appropriate time slot and with a look as pre-defined by the user. All declined events stay in Notes or calendar memory (e.g., hard drive) and show up on the user's calendar as declined events. By having declined entries displayed on the calendar, the end user can easily go back at any time and manually accept those entries. At any time, the user can also delete the declined event notice from the calendar entry without it notifying the chair, since the calendar system notified the chair of that decision when the event was first declined. Using the calendar application, the user can respond back to the chair (sender) to accept or tentatively accept an invitation, or forward and send comments, without having to delete the other event notices that the user had previously accepted for the same time slot.

With reference to FIG. 3, a specific time slot on the calendar 40 may display more than one event. The calendar 40 displays three different events for the 11:30 am time slot: a meeting notice sent out by the user, seen in the first 11:30 am time slot; an accepted invite to a meeting received from Jim, seen in the next 11:30 am time slot; and a tentatively accepted invite to a meeting from Jim, seen in the third 11:30 am time slot. Events shown in calendar 40 have unique icons to differentiate them. For example, the calendar application displays tentatively accepted events with a down arrow icon, private events with a prohibited symbol icon, and accepted events with a split arrow icon, but many other icon options could be used. For example, the calendar application could display tentatively accepted events with a pencil icon, private events with a key icon, and accepted events with a handshake icon.

Figure 4:
FIG. 4 is a declined invite format preconfigured by the end user, with the configuration options shown for a Declined Invite look.
Figure 4:

Declined invites appear on calendar 40 in a format preconfigured by the end user. With reference to FIG. 4, to differentiate the declined events from accepted events on the calendar, the calendar application may display the declined events in a different color, such as red; display a keyword, such as "DECLINED," which would be automatically inserted as a Type Subject identifier in the subject line; display an indented subject line showing differently than normally accepted events in the same time slot; display a different icon in front of the calendar event time slot when the event has been declined; and/or configure various font formats, such as using strike-through, bold, italics, etc. The end user configures the default options for a Declined Invite look. The user may enhance the default options for the Declined Invite look via any of the configurable options mentioned above.

Figure 5:
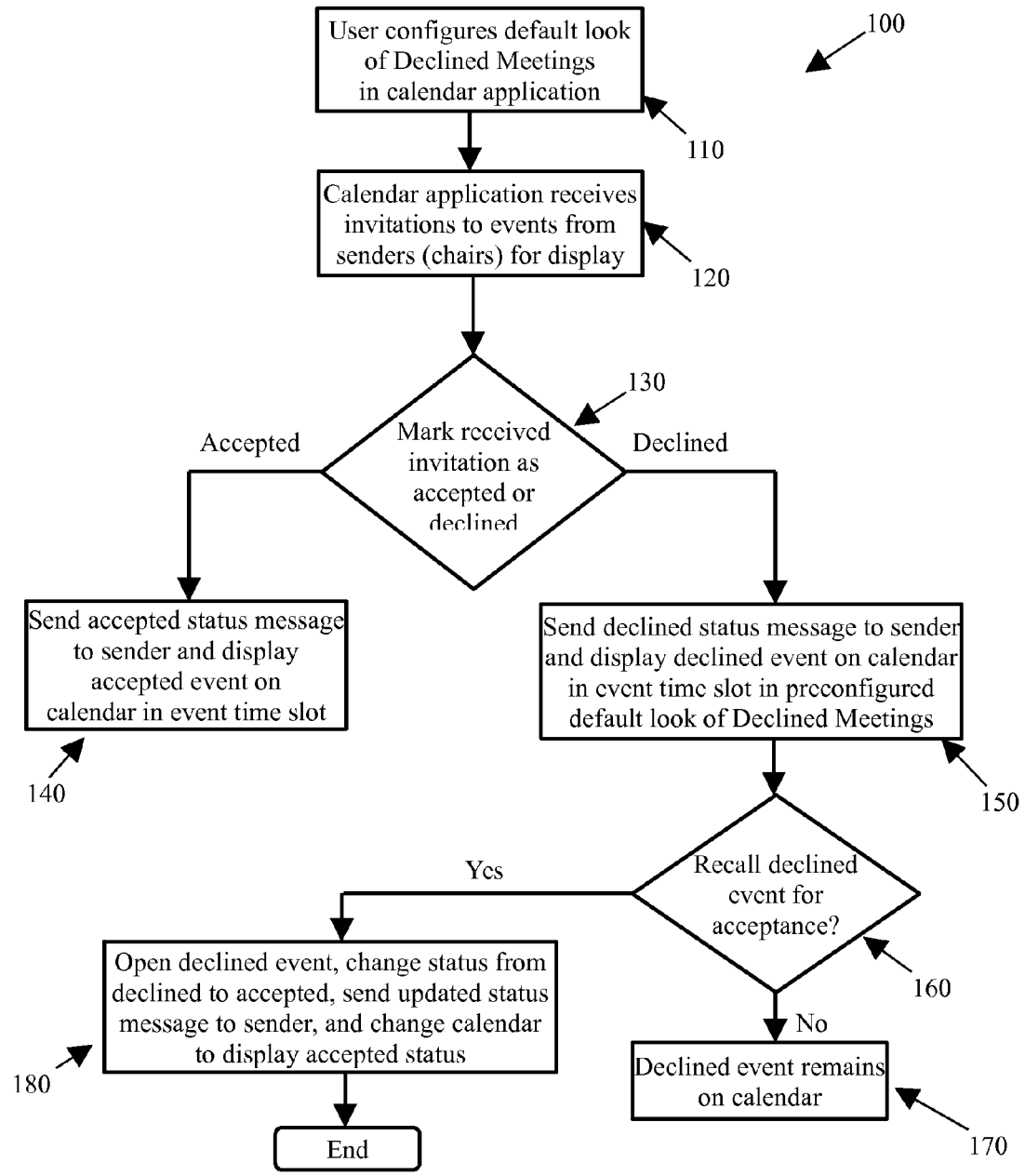
FIG. 5 is a flowchart of a method for recalling a declined event for acceptance within an electronic calendar application.

With reference to FIG. 5, a flow chart 100 illustrates a method for recalling a declined event for acceptance within an electronic calendar application. Starting at block 110, the user configures the default look of Declined Meetings in the calendar application. The default look includes various methods of displaying the Declined Meetings in the calendar, as described previously with reference to FIG. 4. In block 120, the calendar application receives invitations to events from senders (chairs) and displays them to the user. In block 130, the user decides whether to accept or decline the received invitations by marking received invitations as accepted or declined. If the user marks the received invitation as accepted, the calendar application sends an accepted status message to the sender and displays the accepted event on the calendar in a corresponding event time slot, as shown in block 140. If the user marks the received invitation as declined, the calendar application sends a declined status message to the sender and displays the declined event on the calendar in the preconfigured default Declined Meeting look, as shown in block 150. In block 160, the user may decide to recall a declined event for acceptance. As shown in block 180, to recall a declined event for acceptance, the user opens the declined event and changes the status from declined to accepted. The calendar application then sends the updated status message to the sender and changes the calendar to display the event with an accepted status. If the user decides not to recall a declined event, the declined event remains on the user's calendar, as shown in block 170.

The calendar application enables the user to open and view a declined event at a later time. The user may delete (remove from the calendar) declined events, if desired. The user may also open and accept (or tentatively accept) declined events, causing the calendar application to change the event status from declined to accepted and inform the chair (sender) of the updated status change for now attending the event.

Allowing deleted invites to stay on the calendar, even after the time has passed for the time slot, enables the user to refer back at a later time regarding the information that might be associated to that invite. For example, sometimes people attach files or important notes to the calendar invite and those attachments are important even if the user could not attend the event.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for recalling a declined event in an electronic calendar application, said method comprising:
    receiving one or more invitations to one or more events from at least one sender;
    marking the received invitations as either accepted or declined;
    sending a status message to the invitation sender for the received invitation, indicating an accepted or declined invitation status;
    displaying the accepted invitations on the recipient calendar as accepted events in corresponding event time slots;
    displaying the declined invitations on the recipient calendar, within the grid, as declined events in corresponding event time slots, where the displayed declined events differentiate in format from a format of the accepted events by one or more of displaying the declined events on the calendar in a different color, automatically inserting and displaying a keyword "DECLINED" in a subject line, displaying a subject line of declined events indented from a subject line of accepted events in the same time slot, displaying a different icon in front of the calendar event time slot when the event has been declined, and/or configuring the declined events with various font formats; and,
    recalling a previously declined event for acceptance by opening the declined event displayed on the recipient calendar grid, changing the status of the declined event from declined to accepted, and sending an updated status message to the sender indicating that a previously declined event has now been accepted.

* * * * *